March 29, 1960 E. A. WILCKENS ET AL 2,930,081
APPARATUS FOR APPLYING PLASTIC LINERS TO CLOSURES
Filed June 30, 1955 14 Sheets-Sheet 1

INVENTORS:
*Eibe A. Wilckens,*
*William C. Rainer,*
*Giles B. Cooke,*
BY
*Cushman, Darby & Cushman*
ATTORNEYS.

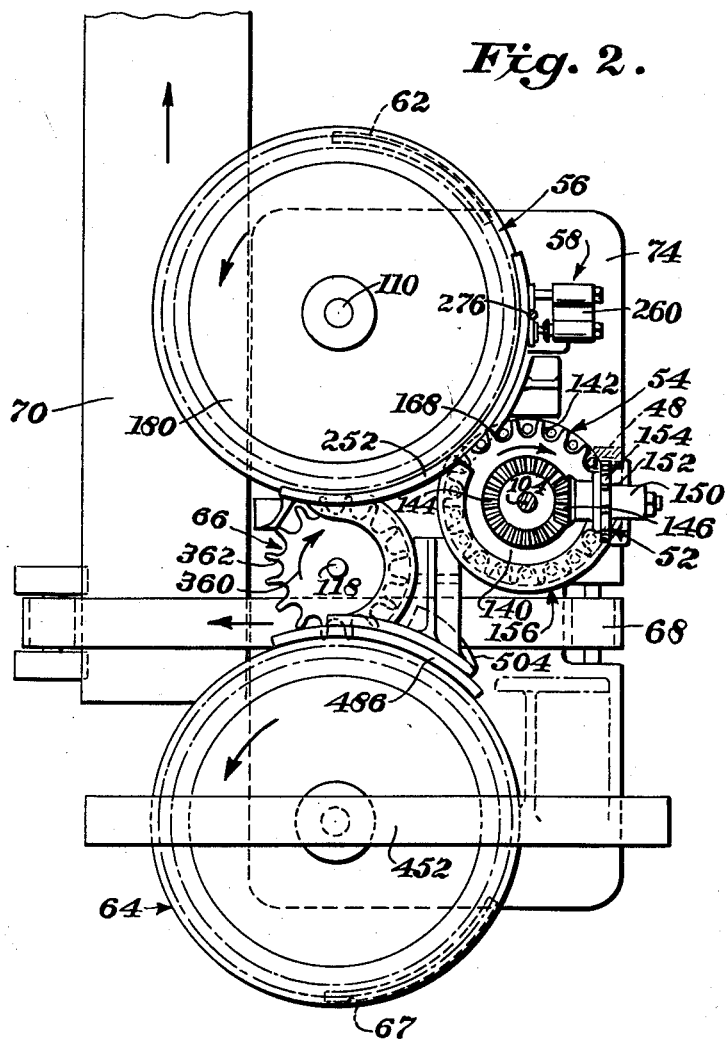

March 29, 1960  E. A. WILCKENS ET AL  2,930,081
APPARATUS FOR APPLYING PLASTIC LINERS TO CLOSURES
Filed June 30, 1955  14 Sheets-Sheet 3
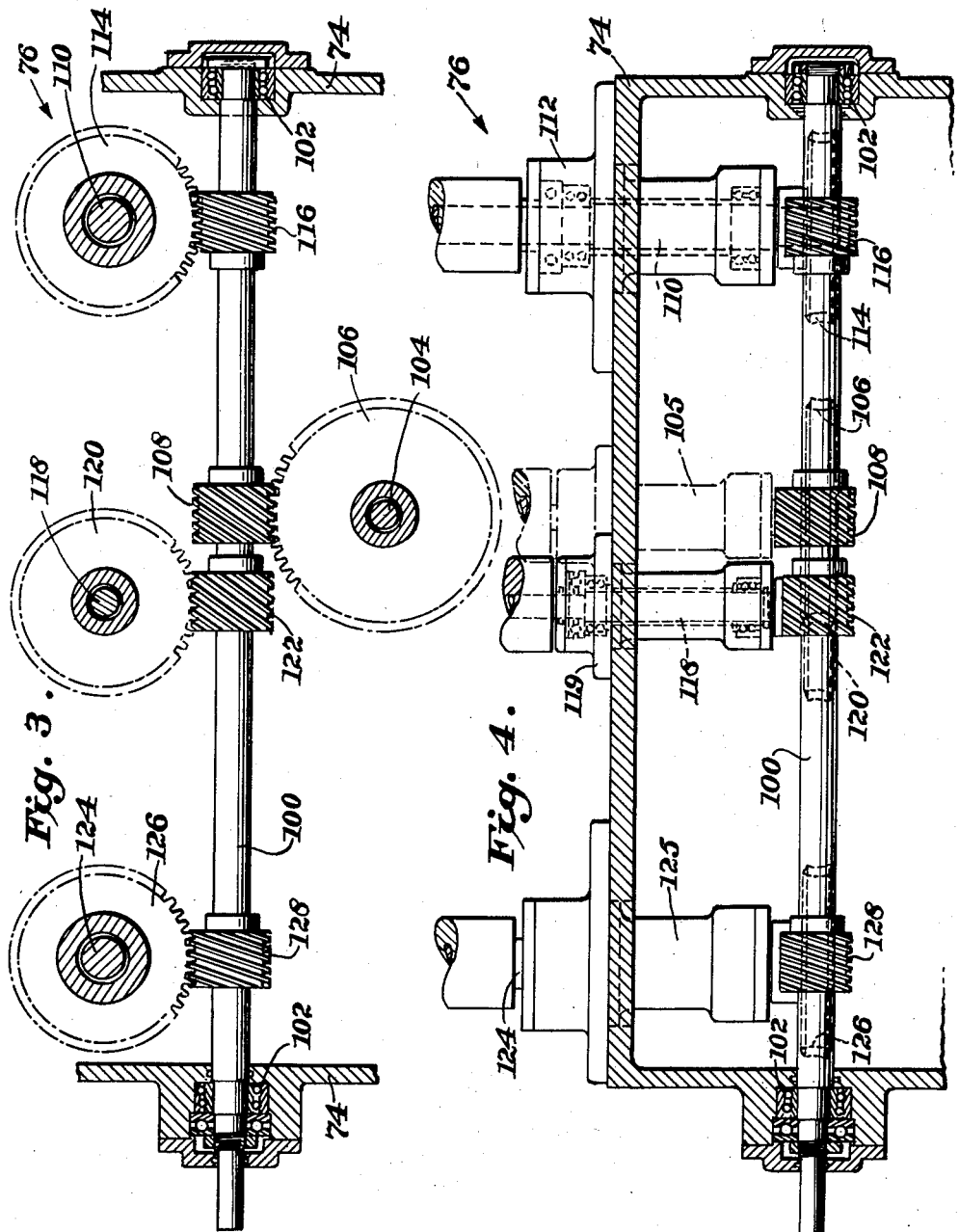
INVENTORS:
*Eibe A. Wilckens,*
*Willim C. Rainer,*
*Giles B. Cooke,*
BY
*Cushman, Darby & Cushman*
ATTORNEYS.

March 29, 1960 E. A. WILCKENS ET AL 2,930,081
APPARATUS FOR APPLYING PLASTIC LINERS TO CLOSURES
Filed June 30, 1955 14 Sheets-Sheet 4
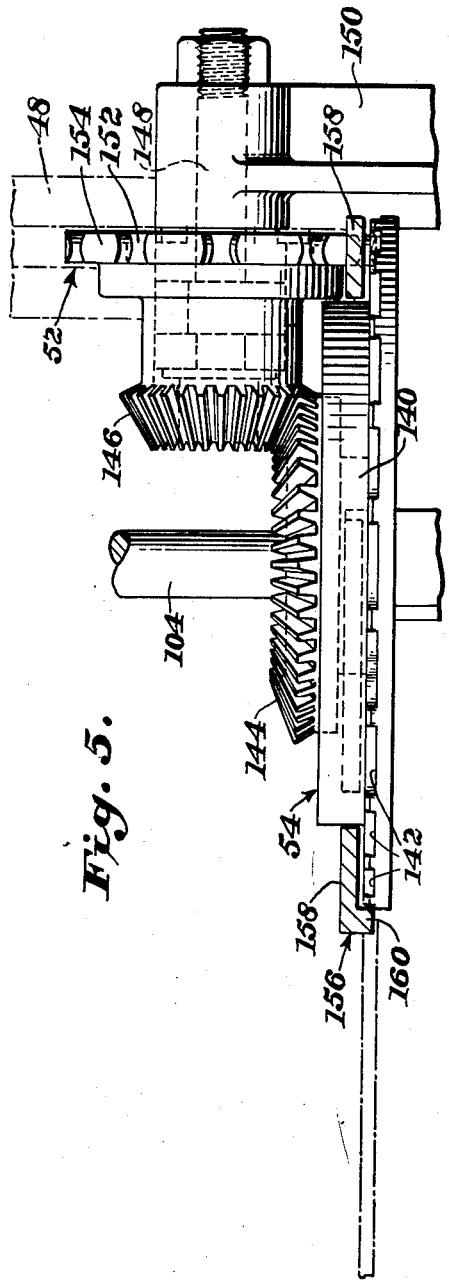
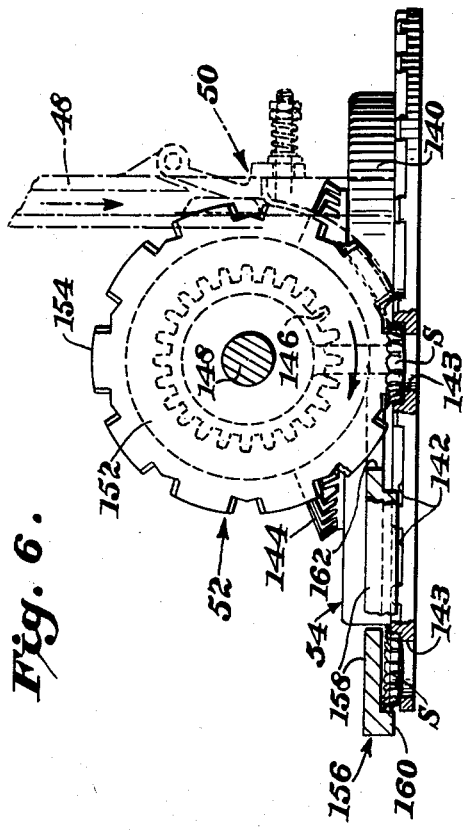
INVENTORS:
*Eibe A. Wilckens,*
*William C. Rainer,*
*Giles B. Cooke,*
BY
*Cushman, Darby & Cushman*
ATTORNEYS.

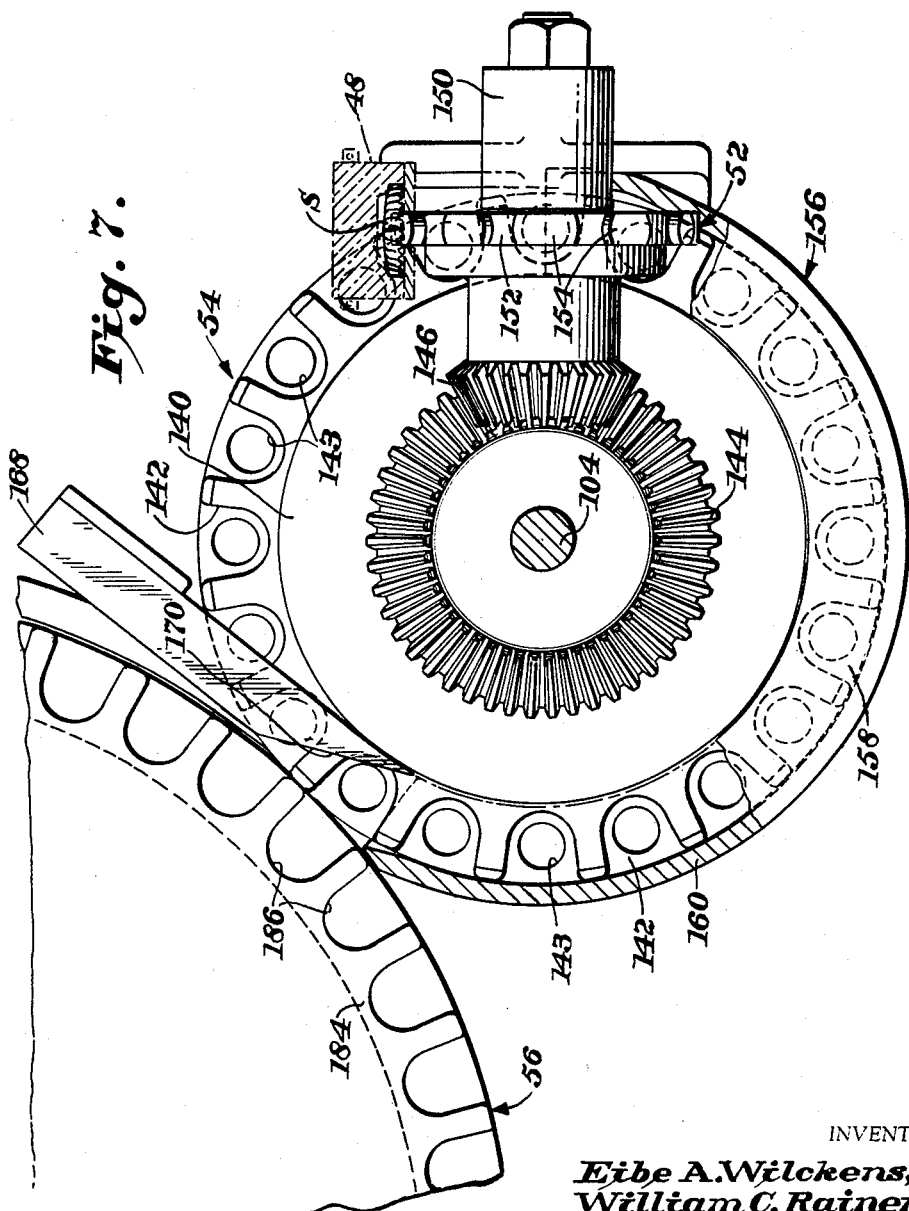

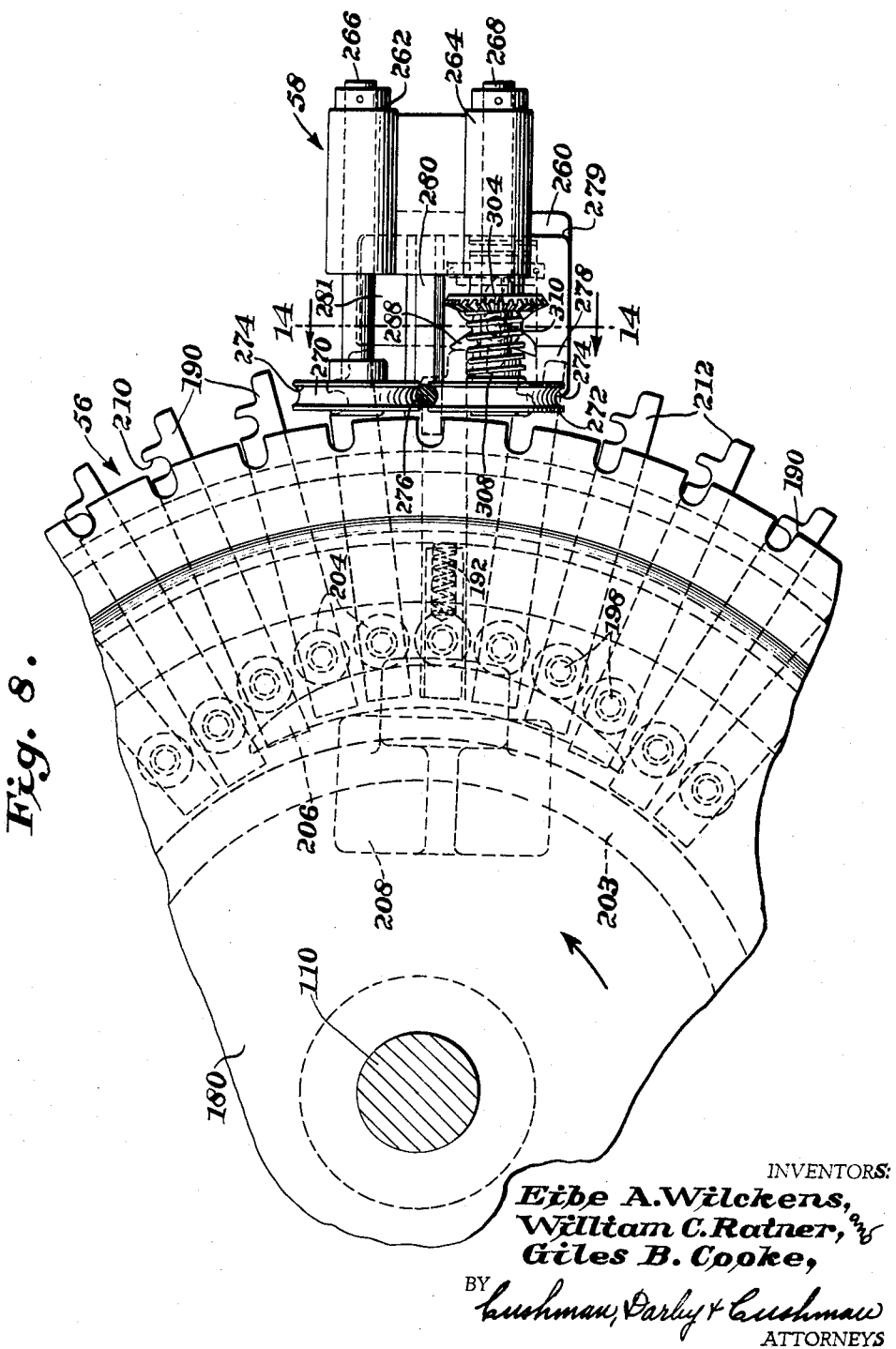

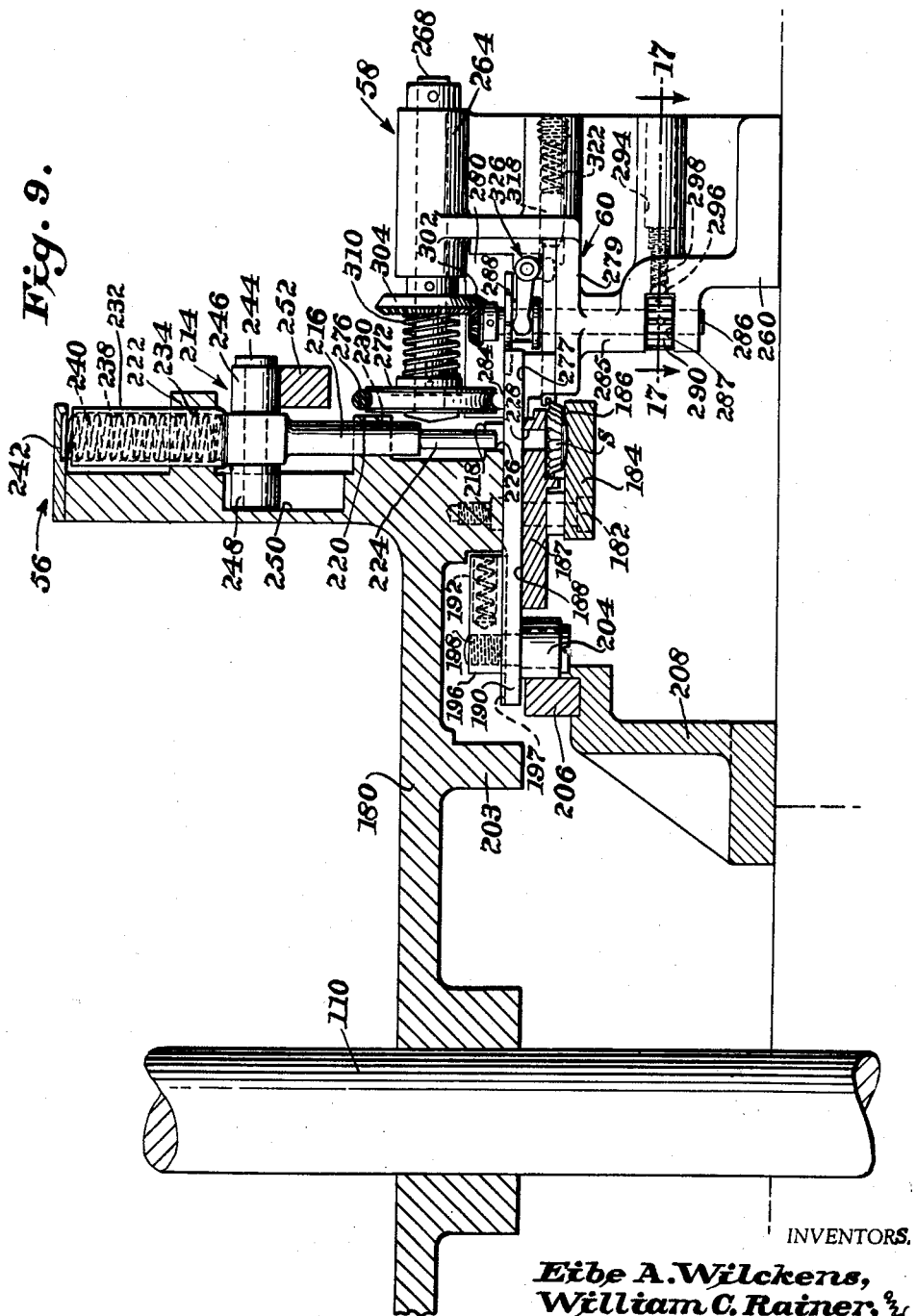

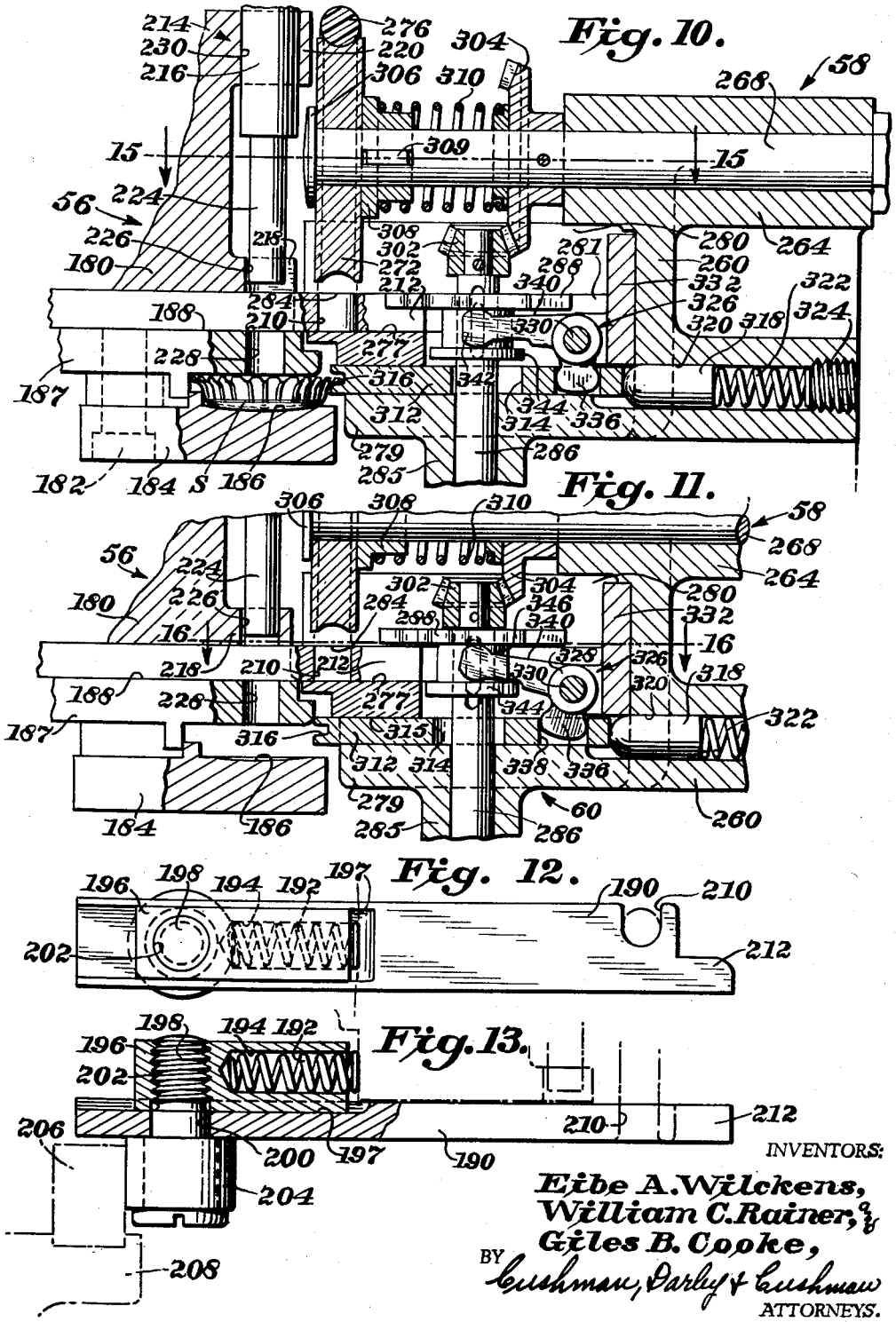

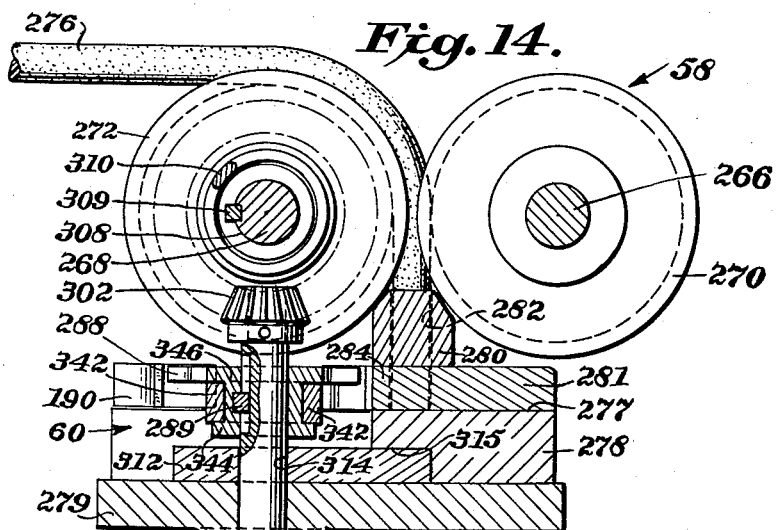
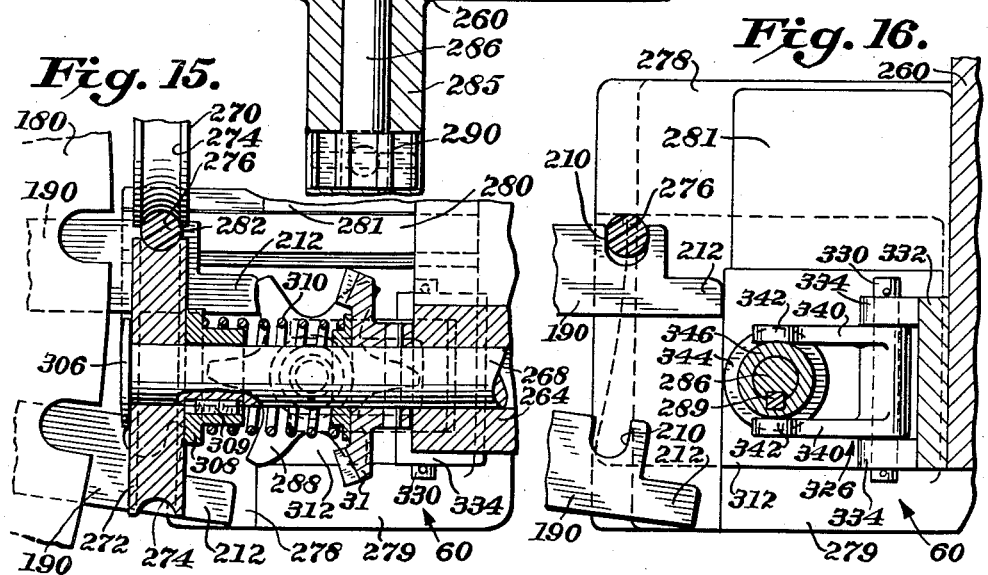
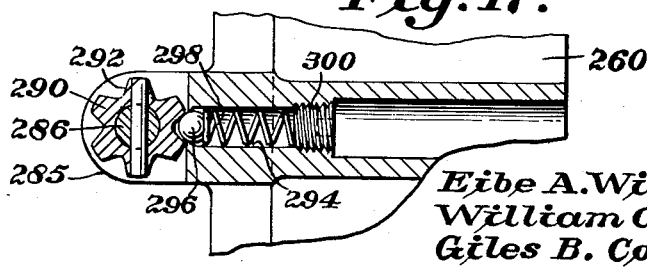

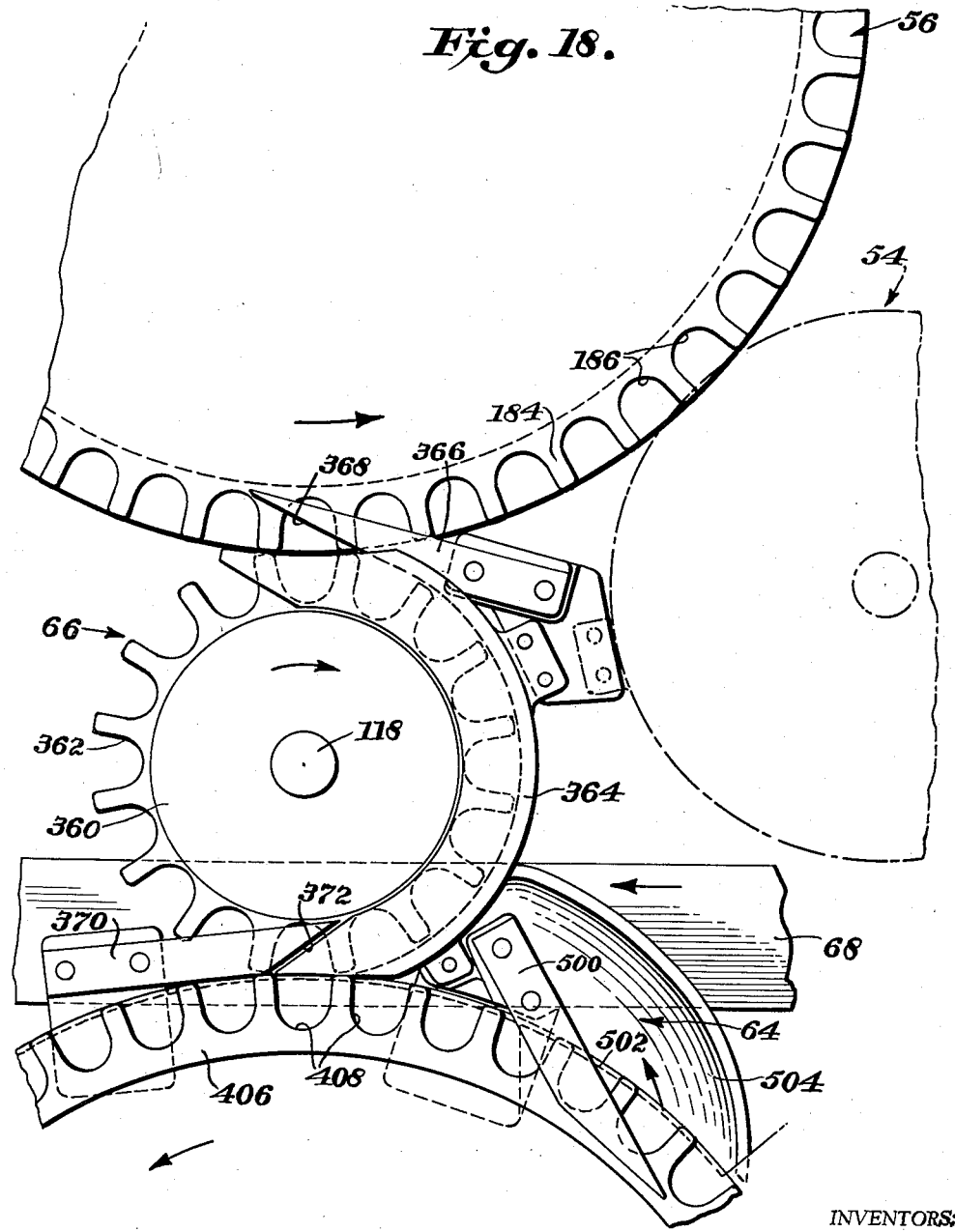

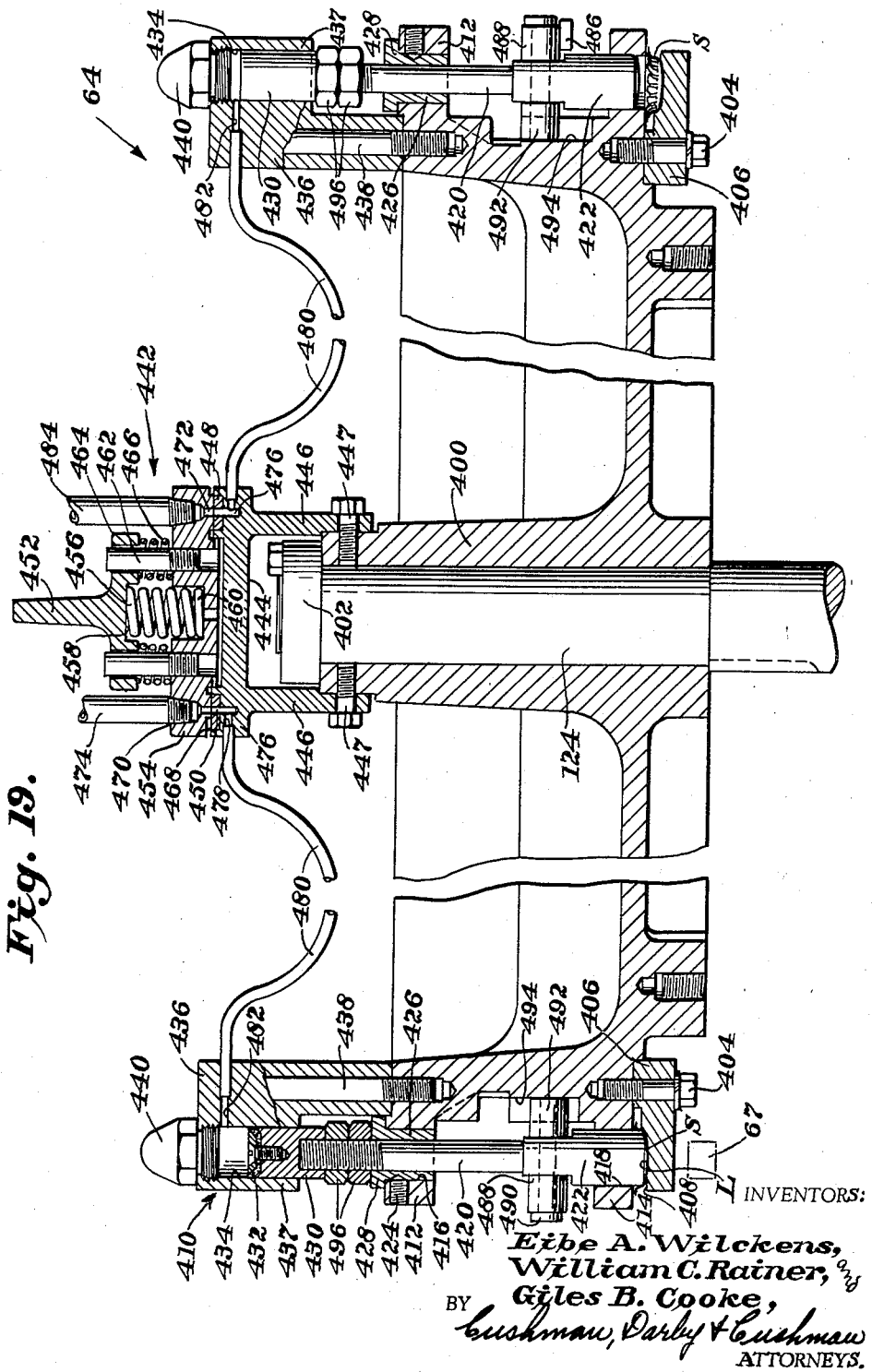

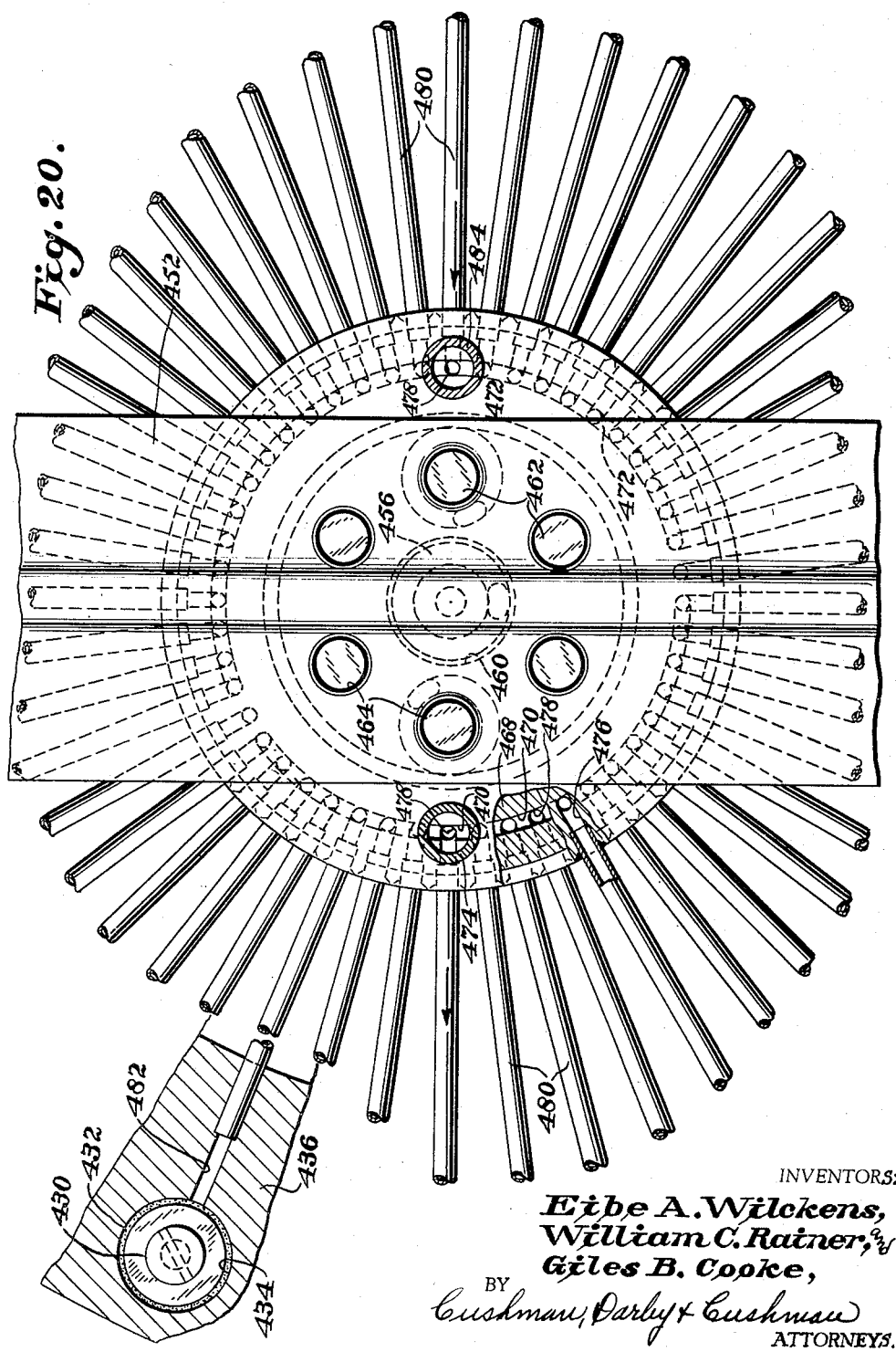

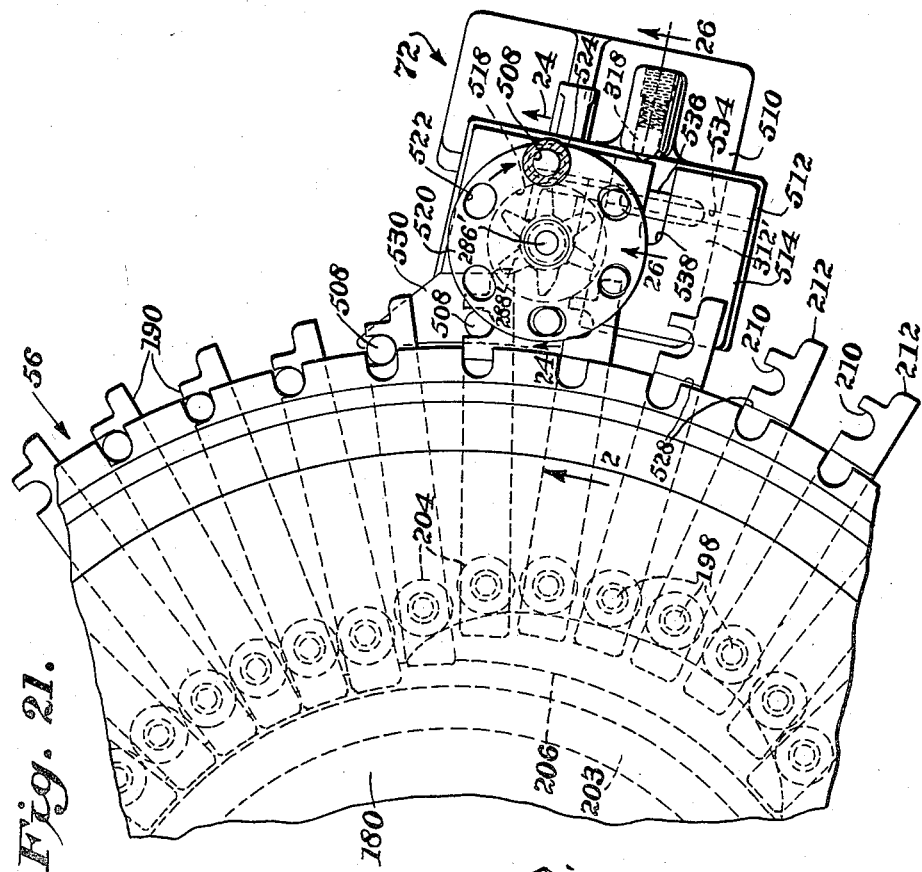
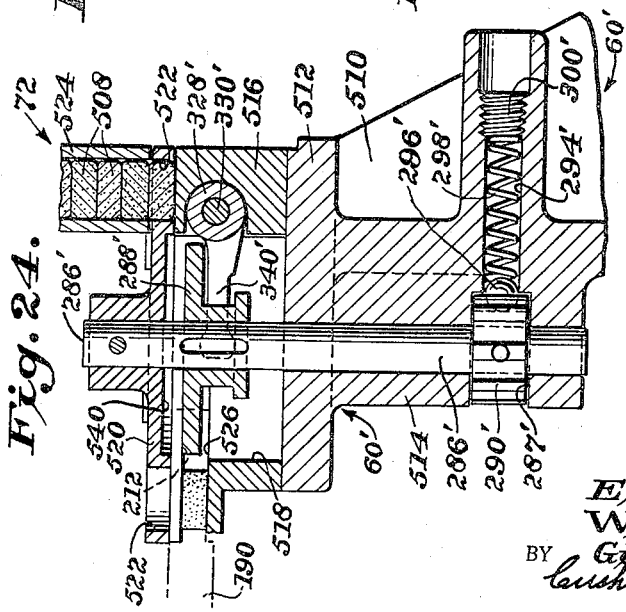
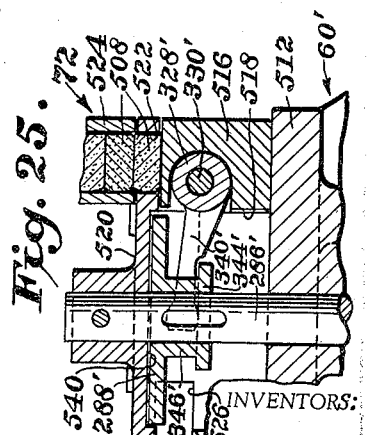

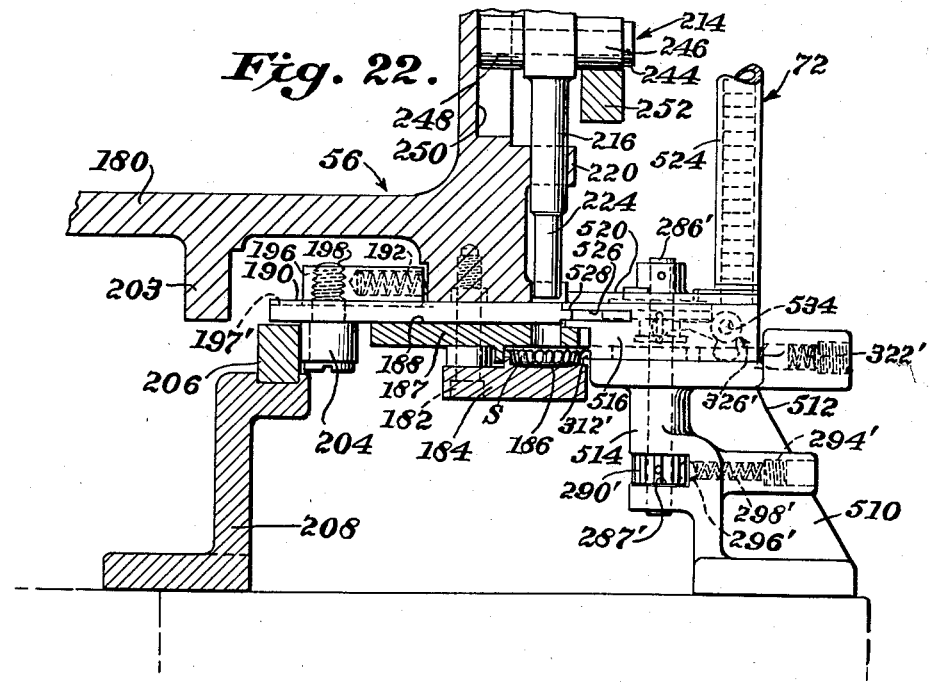
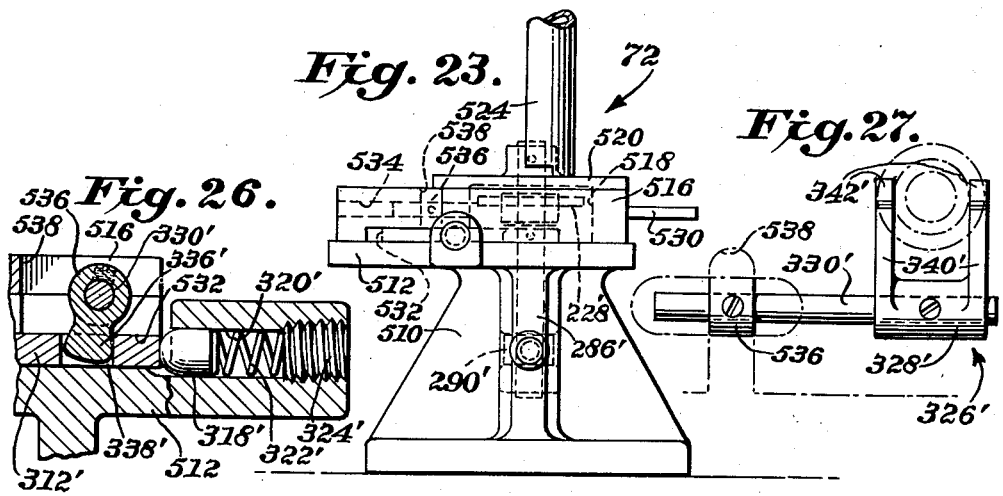
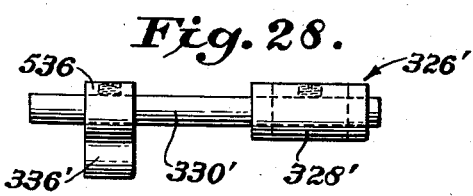

2,930,081

APPARATUS FOR APPLYING PLASTIC LINERS TO CLOSURES

Eibe A. Wilckens, William C. Rainer, and Giles B. Cooke, Baltimore, Md., assignors to Crown Cork & Seal Company, Inc., Baltimore, Md., a corporation of New York Application June 30, 1955, Serial No. 519,204

10 Claims. (Cl. 18—20)

This invention relates to the art of lining closures and more particularly to an improved machine for lining closures, such as bottle crowns and caps, with a solid moldable sealing material preferably of plastic.

One object of the present invention is to provide a machine for lining a closure with a cushion liner of a solid modable sealing material which is continuous in its operation thereby obtaining optimum output.

A further object of the present invention is the provision of an improved plastic sealing material charge supplying mechanism with which the traveling support means for the closures cooperates to deposit a measured charge of sealing material into the central interior of successive closures.

A still further object of the present invention is the provision of a sealing material charge supplying mechanism of the type described which includes improved means operable to permit the supplying of a charge only when a closure is presented to receive the charge.

Still another object of the present invention is the provision of a high speed machine operable to supply a measured charge of a solid moldable sealing material into successive closures, to preheat the charges in the closures so as to adhere the same to the central interior thereof, and to hot mold the preheated charges in the closures to a desired shape.

These and other objects of the present invention will become more apparent during the course of the following detailed description and appended claims.

The invention may best be understood with reference to the accompanying drawings wherein illustrative embodiments are shown.

In the drawings:

Figure 2 is a top plan view of the machine shown in Figure 1;

Figure 3 is a fragmentary top plan view with parts in section showing the drive mechanism of the machine;

Figure 4 is a fragmentary vertical cross-sectional view of the drive mechanism substantially through the drive shaft;

Figure 5 is a fragmentary side elevational view of the shell feeding dial of the machine;

Figure 6 is a fragmentary front elevational view of the shell feeding dial with the shell chute indicated in phantom lines;

Figure 7 is a fragmentary top plan view of the shell feeding dial;

Figure 8 is a fragmentary top plan view of the charge supplying mechanism of the machine showing the same in cooperating relationship with the preheating and lining dial mechanism;

Figure 9 is a fragmentary side elevational view of the structure shown in Figure 8 with the preheating and lining dial mechanism in vertical cross-section for clear illustration;

Figure 10 is an enlarged fragmentary vertical sectional view of the charge supplying mechanism and preheating and lining dial mechanism showing the parts in an operative charge supplying position;

Figure 11 is a view similar to Figure 10 showing the parts in an inoperative no-supply position;

Figure 12 is an enlarged detailed top plan view of a slide member of the preheating and lining dial mechanism;

Figure 13 is a side elevational view of the slide member of Figure 12 partly in section;

Figure 14 is an enlarged cross-sectional view taken along the line 14—14 of Figure 8;

Figure 15 is a fragmentary cross-sectional view taken along the line 15—15 of Figure 10;

Figure 16 is a fragmentary cross-sectional view taken along the line 16—16 of Figure 11;

Figure 17 is an enlarged fragmentary cross-sectional view taken along the line 17—17 of Figure 9;

Figure 18 is a fragmentary top plan view showing the transfer dial between the preheating and lining dial mechanism and the molding dial mechanism;

Figure 19 is a vertical sectional view of the molding dial mechanism;

Figure 20 is a fragmentary top plan view of the molding dial mechanism partly broken away;

Figure 21 is a fragmentary top plan view similar to Figure 8 showing a modified form of charge supplying mechanism;

Figure 22 is a view similar to Figure 9 showing the modified charge supplying mechanism;

Figure 23 is a front elevational view of the modified charge supplying mechanism;

Figure 24 is an enlarged, cross-sectional view taken substantially along the line 24—24 of Figure 21 showing the parts in their operative charge supplying position;

Figure 25 is a view similar to Figure 24 showing the parts in an inoperative no-supply position;

Figure 26 is an enlarged, cross-sectional view taken along the line 26—26 of Figure 21;

Figure 27 is an enlarged detailed top plan view of the bell crank of the modified form of charge supplying mechanism; and Figure 28 is a front elevational view of the bell crank shown in Figure 27.

General construction and operation

Figure 1:
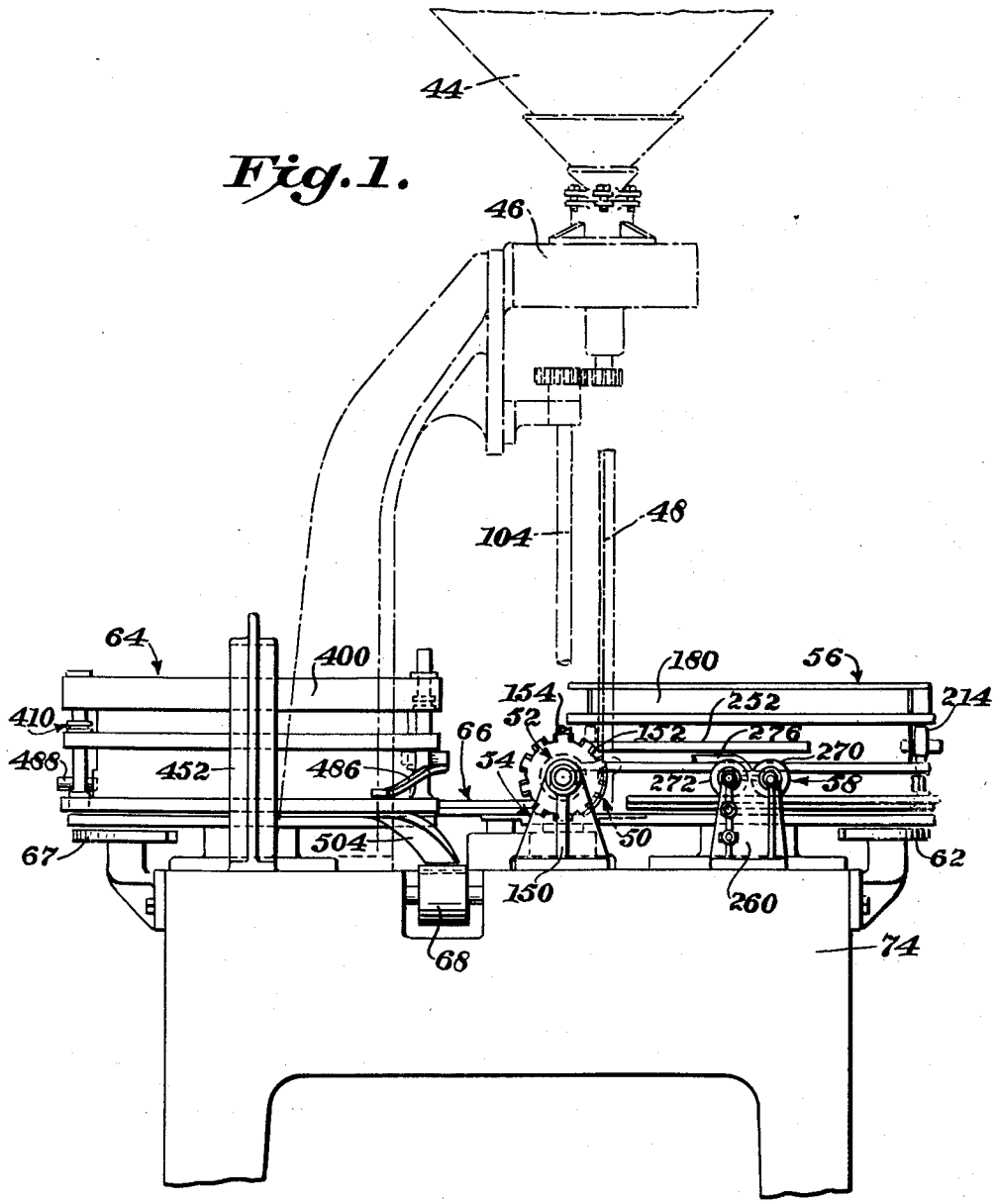
Figure 1 is a front elevational view of a machine embodying the principles of the present invention.

The machine illustrated in the drawings as embodying the principles of the present invention is intended to be used for applying liners of a solid moldable sealing material, preferably plastic, to the interior of closures of the crown type. As shown in the drawings, a crown type bottle cap comprises a metal shell S having an annular fluted skirt and a liner L applied to the central interior thereof. Heretofore, the liners have usually been formed of a cork disk, and while certain aspects of the present machine are capable of being used in assembling cork disk lined closures, the invention is particularly directed to the application of plastic liners in crown shells.

Referring to Figures 1 and 2, shells S are delivered to the machine from a suitable source including chute outlet 44, from where they are directed into a shell feeding mechanism 46. The shells move downwardly from feeding mechanism 46 in single file by way of chute 48. Chute 48 includes a rectifier 50 and delivers properly facing shells to a shell delivery wheel 52. The shell feeding mechanism 46, chute 48, and rectifier 50 (shown in phantom lines) are constructed and operate in the manner disclosed in copending application, Serial No. 131,554, filed December 7, 1949, which issued March 1, 1955 as Patent 2,703,130 to Eibe A. Wilckens and Harvey A. Rau and form no part of the present invention. The shell delivery wheel 52 transfers the properly facing shells onto a shell feeding dial 54, as shown in Figures 5-7, from where they are transferred to a preheating and lining dial mechanism 56. On the dial mechanism 56, the empty shells are moved past a charge supplying mechanism 58 operable to supply measured charges of a solid moldable sealing material for the empty shells. During its movement, dial mechanism 56 is operable to transfer successive charges from the charge supplying mechanism 58 into the central interior of the empty closures. The charge supplying mechanism 58 is preferably provided with a no-closure no-charge mechanism 60 which is operable to prevent the supply of a charge when no shell is presented on the preheating and lining dial mechanism to receive the charge.

The preheating and lining dial 56 then carries the charged shells past a heater means 62 where the solid charges are softened so as to firmly adhere the same to the central interior of the shells. After the charges have been preheated in the closures on the preheating and lining dial, they are transferred to a molding dial mechanism 64 by means of a transfer dial 66. On the molding dial, the charged shells are moved past an additional heating means 67, and a pressure is applied to the heated charges to mold them into a final desired shape.

The finished molded closures are then removed from the molding dial 64 and fed onto a transversely extending endless conveyor 68 from where they are transferred, as by a paddle wheel (not shown) onto a main inspection conveyor 70.

The charge supplying mechanism 58 noted above, is intended to supply solid moldable sealing material in the form of a continuous plastic rod. The dial mechanism 56 takes the charges from the continuous rod by cutting off a predetermined length from the end thereof. In Figures 21-28, there is shown a charge supplying mechanism 72 of a modified form which is adapted to supply solid moldable sealing material in the form of preformed pellets or disks containing a measured amount of plastic material.

As shown in Figures 1 and 2, the various mechanisms noted above may be suitably mounted on a table or main frame 74 which houses a drive mechanism 76 for imparting rotation to the various dials and mechanisms. The detailed construction and operation of each of the dials and mechanisms outlined above are hereinafter described in detail.

Drive mechanism

As best shown in Figures 3 and 4, the drive mechanism 76 comprises a main longitudinally extending drive shaft 100 suitably journaled, as by bearings 102, between the opposite ends of the frame 74. Drive shaft 100 may be driven by any suitable source of power (not shown). The shell feeding dial 54 is driven by a vertical shaft 104 suitably journaled in the frame, as by bearing 105, and having a gear 106 fixed to the lower end thereof. Gear 106 meshes with a cooperating worm gear 108 fixedly secured to the main shaft 100. As shown in Figure 1, the shaft 104 may be extended upwardly to provide a means to drive the aforementioned Wilckens and Rau feeding mechanism 46. The preheating and lining dial mechanism 56 is driven by a vertical shaft 110 journaled in the frame, as by bearing 112. The lower end of shaft 110 has a gear 114 fixedly secured thereto which meshes with a cooperating worm gear 116 fixedly secured to the main drive shaft 100. The transfer dial 66 is likewise driven by a main vertically disposed shaft 118 journaled in the frame, as by bearing 119, and having a gear 120 fixedly mounted to the lower end thereof which meshes with a worm gear 122 fixed to the main shaft 100. The molding dial 64 is also driven by a vertical shaft 124 journaled in the frame, as by bearing 125, and having a gear 126 fixed to the lower end thereof which meshes with a worm gear 128 fixed to the main shaft 100.

It can thus be seen that each of the dials and mechanisms of the present invention are driven in timed relation from the main drive shaft 100 by the utilization of appropriately selected mating gears. It will also be understood that the drive mechanism shown discloses merely one embodiment of a means for rotating the various dials and mechanisms of the present invention, and that other drive mechanisms may be provided if desired.

Shell delivery wheel and feeding dial

The shell feeding dial 54, as more particularly shown in Figures 5-7, includes a circular dial plate 140 fixedly mounted on the upper end of shaft 104. The plate 140 is provided with a plurality of circumferentially spaced pockets or seats 142 within which the empty shells are adapted to be positioned. An aperture 143 preferably extends through each seat so as to compensate for the convexity of the shell and permit the same to be properly supported. Of course, the seat may be made concave if desired rather than providing the apertures 143. Secured to the shaft 104 above plate 140 is a bevel gear 144 arranged to mesh with a cooperating bevel gear 146 journaled on one end of a shaft 148, the other end of which is fixedly mounted above the table by a suitable support 150. The shell delivery wheel 52 comprises a wheel plate 152 fixedly connected with gear 146 for rotation therewith about shaft 148. Fixedly mounted on the plate 152 are a plurality of radially extending fingers 154 disposed in circumferentially spaced relation around the entire periphery thereof. As shown in Figure 6, these fingers are preferably made integral with the plate 152, and are operable to contact the interior of the properly facing empty shell issuing from the chute 48 so as to transfer them from the lower end of the chute into the pockets 142 of the dial plate 140.

A segmental guard rail member 156 is fixedly mounted by any suitable means to the table 74 in surrounding relation to the portion of the outer periphery of the dial plate extending between the shell delivery wheel 52 and the preheating and lining dial mechanism 56. The member 156 is preferably L-shaped in cross-section and includes a horizontally disposed leg 158 spaced above the dial plate pockets sufficiently to permit free passage of the shells therebelow and a vertically disposed leg 160 spaced outwardly of the dial plate pockets sufficiently to prevent radial movement of the shells during their movement with the dial. The end of the horizontal leg 158 adjacent the shell delivery wheel 52 is provided with a cut out portion 162 through which the wheel plate 152 extends. The cut out end of horizontal leg 158 is thus positioned so as to engage the upper edge of the shells carried by the fingers 154 and serves to insure that the shells will be removed from their contact with the fingers. As the shells leave the fingers, they are deposited in successive seats 142 of the plate 140 where they are properly supported during the movement of the plate.

The shells are moved by the dial plate seats from the shell delivery wheel 52 to a point adjacent the preheating and lining dial mechanism where they are then moved from dial plate 140 onto the preheating and lining dial mechanism. To this end, a guide element 168 in fixedly mounted by any suitable means to the table 74 and includes a cam surface 170 disposed just above the dial plate seats so as to engage the shells thereon and transfer them onto the preheating and lining dial mechanism.

Preheating and lining dial mechanism

As best shown in Figures 8 and 9, the preheating and lining dial mechanism 56 comprises a main dial frame 180 fixedly secured by any suitable means to the shaft 110 above the table 74. Secured in vertically spaced relation to the lower outer periphery of the dial frame 180 by any suitable means, such as by bolts 182, is a lower annular ring 184 having a plurality of circumferentially spaced pockets or seats 186 formed in the upper surface thereof for receiving the empty shells S as they are transferred by the cam surface 170 from the dial plate pockets 142, see Figure 7. An upper annular ring 187 is disposed above ring 184 and secured to the dial frame by the bolts 182. A plurality of radially extending grooves 188 are formed in the upper surface of the ring 187 above the seats 186 for slidably receiving a plurality of radially disposed slide members 190.

As best shown in Figure 12, each slide member 190 is resiliently urged inwardly of the dial frame by means of a spring 192 disposed in a bore 194 of a block 196. Each block 196 is secured within a slot 197 formed in the upper rear surface of the associated slide member 190 by a stud 198 extending through an aperture 200 formed in the slide member and threadedly engaged within a cooperating aperture 202 in the block. Springs 192 normally urge the rear ends of the slide members into abutting engagement with an annular flange 203 depending from the main dial frame 180. Mounted on each stud 198 below the associated slide member 190 is a cam follower in the form of a roller 204. The rollers 204 are arranged to cooperate with a segmental cam track 206 stationarily mounted on the table 74 near charge supplying mechanism 58 by a supporting frame 208. The cam track 206 and rollers 204 operate during the rotation of the dial frame 180 to move the slide members radially outwardly against the action of spring 192 as they move past the charge supplying mechanism 58.

The other end of each slide member 190 is provided with a U-shaped slot 210 facing in the direction of rotation of the dial frame and of a size sufficient to receive the plastic charge from the charge supplying mechanism 58. Extending radially outwardly of the outer end of each slide member 190 is a finger 212 for a purpose hereinafter to be more fully described. In brief, the slide members 190 are arranged to transfer a measured charge from the charge supplying mechanism 58 to the shell supported on the associated seat.

In order to insure that the charge transferred by each slide member from the charge supplying mechanism will be deposited into the center of the shell, a suitable plunger device 214 is provided above each of the seats 186. Each plunger device 214 includes a plunger member 216 mounted for vertical reciprocation within three vertically spaced annular flanges 218, 220 and 222 extending radially outwardly from the periphery of the dial frame 180. As shown in Figure 9, each plunger member 216 includes a lower end 224 of reduced cross-sectional area adapted to reciprocate within a U-shaped notch 226 formed in the lower flange 218, a vertically aligned aperture 228 extending through the upper annular ring 187, and the U-shaped slot 210 of the associated slide member 190. The central portion of each plunger member is mounted within a vertically aligned bore 230 formed in the intermediate flange 220, and the upper end thereof is enlarged as at 232. Extending through the upper flange 222 is a plurality of circumferentially spaced vertical bores 234 for receiving the upper ends 232 of the plunger members. The upper end 232 of each plunger member 216 is provided with a vertically extending bore 238 for receiving a coil spring 240, the upper end of which bears against the lower surface of an annular plate 242 suitably secured to the upper peripheral surface of the dial frame.

The central portion of each plunger member 216 between flanges 220 and 222 is provided with a horizontally extending shaft 244 having a cam roller 246 journaled on the outer end thereof. The inner end of each shaft 244 has a guide roller 248 journaled thereon to reciprocate within a vertically extending slot 250 formed in the adjacent peripheral portion of the dial frame. The engagement of guide rollers 248 in slots 250 serves to prevent the plunger members 216 from rotating about their own axes.

As shown in Figure 2, a stationary arcuate cam track 252 is mounted on the main frame 74 in a position to engage cam rollers 246. The cam track 252 is operable to move the plunger members 216 upwardly into the position shown in Figure 9 so that the seats 186 are unobstructed for the free transfer of the empty shells from the shell feeding dial mechanism 52. Cam track 252 maintains the plunger members in a raised position during the transfer of the charges from the charge supplying mechanism 58 by the slide members 190. Shortly after the transfer of the charges has been effected by the slide members, the cam track 252 terminates so that each plunger member 216 is free to move downwardly under the action of its spring 240 to deposit the charges carried by the associated slide member into the central interior of the closure.

The plunger members maintain the charges in the central interior of the shells during the subsequent movement of the dial frame past the heater means 62, which is preferably in the form of a gas burner, where the charge is heated sufficiently to adhere the same firmly to the shell. Just before the heated charged shells reach the transfer dial 66, cam track 252 engages the cam rollers 246 to raise the plunger members and permit free transfer of the shells from the dial frame.

*The charge supplying mechanism of Figures 1–20*

As shown in Figures 2 and 8, the charge supplying mechanism 58 is mounted on the main frame 74 adjacent the outer periphery of the preheating and lining dial mechanism 56. The charge supplying mechanism 58 includes a supporting frame 260 rigidly mounted on the main frame 74 and providing a pair of upper, horizontally spaced bearings 262 and 264. A pair of parallel shafts 266 and 268 are suitably journaled in the bearings 262 and 264 respectively, and have a pair of cooperating rollers 270 and 272 mounted on the outer ends thereof. The outer peripheral surface of each of the rollers is formed with a concave substantially semi-cylindrical groove 274 between which a continuous rod of solid moldable sealing material 276 is fed.

The cooperating rollers 270 and 272 are arranged to move the free end of the plastic rod 276 into engagement with an upper, horizontal stop surface 277 of a plate member 278 fixedly mounted on a ledge 279 formed on the supporting frame 260. The stop surface 277 is substantially level with the lower surface of slide members 190, as can be seen from Figures 10 and 11. An elongated guide member 280 is mounted in vertically spaced relation to the stop surface 277 by means of a spacer plate 281. The outer end of the guide member 280 extends between rollers 270 and 272 and has a vertical aperture 282 formed therein for receiving the free end of the rod. The lower surface 284 of the guide member 280 spaced above stop surfaces 277 provides a shearing surface which cooperates with the upper surface of the slide members 190 to shear off the end portion of the rod disposed between surfaces 277 and 284.

The cooperating rollers 270 and 272 feed the free end of the plastic rod into engagement with stop surface 277 by means incorporating the no-closure no-charge mechanism 60 which will now be described. Journaled in a bearing 285 formed in the supporting frame 260 below ledge 279 in alignment with bearing 264, is a vertically extending shaft 286. A star wheel 288 is mounted on the upper end of the shaft 286 above ledge 279 by any suitable means, such as key 289. As shown in Figure 10, the key 289 permits the star wheel 288 to move vertically, and in its lowermost axial position on the shaft 286, the arms thereof are disposed so as to be engaged by the fingers 212 of slide members 190. Fixedly secured to the lower end of the shaft 286 within a suitable slot 287 formed in the bearing 285, is a detent collar 290 having notches 292, corresponding in number to the number of arms of the star wheel, formed in the periphery thereof. The portion of the supporting frame 260 adjacent the detent collar 290 is provided with a horizontal bore 294 within which a ball 296 is disposed. The ball 296 is resiliently urged into engagement with the notches 292 by means of a spring 298 disposed within the bore 294. One end of the spring 298 bears against the ball 296 and the opposite end thereof bears against a plug 300 threadedly engaged within the bore 294. The resilient engagement of ball 296 within notches 292 serves to position each successive arm of the star wheel for proper registering with each successive finger 212.

The extreme upper end of the shaft 286 has fixedly secured thereto a bevel gear 302 arranged to mesh with a cooperating bevel gear 304 fixedly secured to the shaft 268. The roller 272 is freely mounted on the outer end of the shaft 268 between an outer flange member 306 and a friction clutch 308 connected as by key 309, with the shaft for axial movement with respect thereto. A coil spring 310 extends between the friction clutch 308 and bevel gear 304 in surrounding relationship to the shaft 268 so as to resiliently urge the clutch into engagement with the roller 272.

From the above, it can be seen that engagement of the fingers 212 with the arms of the star wheel will cause intermittent rotation of the shaft 286. This intermittent rotation of the shaft 286 will be transmitted to the shaft 268 through cooperating bevel gears 302 and 304. It is preferable that the amount of rotary movement of the shaft 268 in each intermittent movement be greater than the amount of rotary movement of the roller 272 necessary to move the free end of the plastic rod from the upper shearing surface 284 to the lower stop surface 277. Thus, this greater amount of movement of the shaft 268 is transmitted to the roller 272 by the friction clutch 308 and the excess amount of movement will result in a mere slippage of the clutch member with respect to the roller. This operation insures that the free end of the rod will be fed completely between the surfaces 277 and 284 so that an accurate, predetermined measured amount of material will be cut off by each slide member.

The non-closure no-charge mechanism 60 moves the star wheel 288 upwardly with respect to the shaft 286 when there is no shell present on the seat of the associated slide member adjacent the star wheel so that the shaft will not be rotated to move the free end of the rod into a position to be cut off by the slide member. As shown in Figures 10, 11 and 14–16, the mechanism 60 includes a shell engaging member 312 disposed on the upper surface of ledge 279. The shaft 286 extends through an elongated aperture 314 formed in the central portion of the member 312, permitting the latter to slide toward and away from preheating and lining dial mechanism 56 through a slot 315 formed in the lower surface of plate member 278. The outer shell engaging surface of the member 312 is provided with a groove 316 which conforms with the contour of the fluted skirt of the shell so as to receive the same. The width of the shell engaging surface of the member 312 is greater than the spacing between two closures carried by adjacent seats but less than the spacing between the outer two closures carried by three adjacent seats.

The shell engaging member 312 is resiliently urged into engagement with the shells by means of a plug 318 slidably mounted within a horizontal bore 320 formed in the frame 260 adjacent the inner end of the member 312. A coil spring 322, disposed within the bore 320 between a fixed plug 324 and the plug 318, urges the outer end of the latter into engagement with the inner end of the shell engaging member 312.

Movement of the shell engaging member 312 is transmitted to the axially movable star wheel 288 by means of a bell crank 326 having a central hub portion 328 fixedly mounted on a shaft 330. The shaft 330 is mounted on the frame 260 by a vertically disposed member 332 having a pair of horizontally spaced, apertured ears 334 within which the shaft 330 is journaled. The central hub portion 328 of the bell crank 326 is mounted on the shaft 330 between the ears 334 and has a lower arm 336 depending therefrom which extends within a cooperating aperture 338 formed in the shell engaging member 312. Extending horizontally from the central hub portion 328 of the bell crank 326 is a pair of spaced upper arms 340 having arcuate portions 342 formed on the free ends thereof. The arcuate portions are arranged to extend between the star wheel 288 and an annular flange 344 formed on the lower end of a hub 346 depending from the star wheel.

Referring now to Figure 8, it will be seen that as the preheating and lining dial rotates, the slide members 190 in proximity to the charge supplying mechanism 58 will be moved radially outwardly by engagement of the cam track 206 with rollers 204. Assuming that shells are disposed on all of the seats 186 passing the charge supplying mechanism 58, the shell engaging member 312 will be maintained in the position shown in Figure 10, since the width of the shell engaging surface of the member 312 is such that a shell will be in engagement therewith at all times. That is, before the shell which is in engagement with the member 312 leaves the trailing end thereof, the next adjacent shell will have engaged the leading edge thereof. In this manner, the star wheel 288 is maintained in the position shown in Figure 10 so long as an uninterrupted series of shells are present on the seats 186.

As each slide member 190 moves past the charge supplying mechanism 58, the fingers 212 thereof will first engage an arm of the star wheel 288 and rotate the latter an angular distance corresponding to the angular distance between adjacent notches 292 of the collar 290. Rotation of the star wheel 288 will rotate the shaft 286 and hence, the bevel gear 302 which meshes with the gear 304. Rotation of the gear 304 will turn shaft 268 which, through friction clutch 308, will in turn rotate the drive roller 272. Rotation of the roller 272 will move the free end of the rod 276 into engagement with the stop surface 277 so that as the slide member 190 moves past the star wheel, the free end of the rod between surfaces 277 and 284 will be engaged within the U-shaped slot 210. As the slide member 190 moves past the rod, the free end portion thereof will be sheared or cut off. The surface 284 and upper surface of the slide member provide cooperating surfaces to effect the shearing action. The charge of plastic or moldable sealing material within the slot 210 is then moved radially inwardly with the slide member as the latter is retracted under the action of spring 192 and the control of cam track 206.

If a shell is not delivered to a seat 186 on the dial mechanism 56 from the shell feeding dial 54, the no-closure no-charge mechanism 60 operates to prevent the supply of a charge when the empty seat moves past the charge supplying mechanism. As shown in Figure 11, when a seat 186 having no shell S thereon moves adjacent the shell engaging member 312, the latter will be moved inwardly under the action of spring 322. In this regard, it is to be noted that the width of the shell engaging surface of the member 312 is less than the spacing between the outside shells of three adjacent shells so that inward movement is possible. Movement of the member 312 inwardly will cause bell crank 326 to pivot in a clockwise direction as viewed in Figure 11 so that the upper arms 340 will move the star wheel 288 axially upwardly with respect to the shaft 286. Thus, when the slide member 190 associated with the empty seat 186 approaches the star wheel, the latter will be disposed upwardly out of engagement therewith in the position shown in Figure 11. It will be understood that with no engagement between the slide member and the star wheel, the roller 272 will not be rotated to feed the free end of the rod into a position to be engaged within the slot 210. Assuming that a shell is present in the next adjacent seat, this shell will engage the member 312 to move the same outwardly into its normal operating position, such as shown in Figure 10 so that normal operation will be resumed.

Transfer dial

Referring to Figure 18, the transfer dial 66 comprises a circular plate 360 fixedly secured to the upper end of shaft 118. The plate 360 is provided with a plurality of circumferentially spaced pockets or seats 362 for receiving the charged shells. Disposed on the outer periphery of the plate 360 is a segmental guard rail member 364 of L-shaped cross-section similar to the member 156 of the shell feeding dial 54. The shells S, with preheated charges disposed therein, are transferred onto the dial plate 360 by a guide member 366 suitably mounted on the table 74 in fixed relation thereto. The guide member 366 includes a cam surface 368 disposed in the path of movement of the shells so as to move the latter from the seats 186 of the preheating and lining dial mechanism into the pockets 362 of the dial plate 360. The shells are then carried by the transfer dial to a point adjacent the molding dial mechanism 64. During this movement, the member 364 serves to maintain the shells properly positioned in the pockets. A second guide member 370 is suitably mounted in fixed relation on the table 74 adjacent the molding dial mechanism 64 and has a cam surface 372 disposed in the path of movement of the shells so as to move the latter from the pockets 362 of the transfer dial plate 360 onto the molding dial mechanism 64.

Molding dial mechanism

As shown in Figure 19, the molding dial mechanism 64 comprises a main dial frame 400 fixedly mounted, as by bolted collar 402, to the upper end of shaft 124. Secured to the lower outer periphery of the frame 400, as by bolts 404, is an annular ring 406 having a plurality of circumferentially spaced seats 408 formed in the upper surface thereof. A plunger device, generally indicated at 410, is disposed above each of the seats 408.

The outer periphery of the dial frame 400 is formed with an upper annular flange 412 and a vertically spaced lower annular flange 414. Flanges 412 and 414 are provided with a series of aligned, circumferentially spaced apertures 416 and 418 respectively, within which the plunger devices are mounted for vertical reciprocation. Each plunger device 410 includes a vertically disposed plunger 420 having a molding head 422 fixedly secured to the lower end thereof and slidable within an aperture 418. Fixedly mounted, as by set screw 424 within each aperture 416 is a bushing 426 having an upper flange 428. Bushing 426 receives the central portion of plunger 420 and the flange 428 thereof serves to limit the downward movement of the same as will be more fully explained hereinafter.

The upper end of each plunger 420 is fitted with a piston member 430 having suitable packing 432 secured to the upper end thereof. Each piston 430 is adapted to reciprocate within a cylindrical chamber or bore 434 formed in an upper dial frame member 436. The frame member 436 is preferably in the form of an annular upstanding ring having a chamber providing, radially extending annular flange 437 disposed in vertically spaced relation to the flange 412. Any suitable means, such as bolts 438, may be utilized to secure the frame member 436 to the main dial frame 400. The upper end of each chamber or bore 434 may be closed by means of a plug 440 threadedly engaged therein.

Fluid pressure applying means, generally indicated at 442, is provided for applying a molding pressure to each piston 430. The fluid pressure applying means 442 includes a plate member 444 having a depending annular flange 446, the lower end of which is secured to the dial frame 400 for rotation therewith, as by bolts 447. The upper surface of the plate 444 is provided with an annular groove 448 for receiving an annular sealing member 450.

Mounted on the table or frame 74 in fixed relation thereon is a frame member 452 which extends from one side of the molding dial 64 to the other above the same. The central portion of the frame member 452 carries a plate 454 arranged to cooperate with plate 444. The plate 454 is mounted on the frame member 452 by means of a central coil spring 456 having its upper end engaged within a groove 458 formed in the lower surface of the frame member and its lower end engaged within a groove 460 formed in the upper surface of the plate 454. Disposed in surrounding relationship with the spring 456 is a plurality of annular spaced guide studs 462 having their lower ends threadedly engaged within suitable cooperating threaded apertures in the plate 454. The upper end of each stud 462 extends through a registering aperture 464 formed in the frame member 452 and a coil spring 466 surrounds each stud 462 and bears against the adjacent portion of the plate 454 and frame member 452. It will be seen that the central coil spring 456 and surrounding coil springs 466 resiliently urge the plate 454 downwardly toward the plate member 444 so that an annular portion 468 thereof will engage the sealing member 450 carried by plate member 444 in pressure-tight engagement.

As best shown in Figure 20, a pair of spaced segmental grooves 470 and 472 are formed in the annular portion 468 of the plate 454 and a source of fluid pressure, preferably compressed air, is supplied to the groove 470 by a pipe 474 in communication therewith. The plate 444 is provided with a series of circumferentially spaced ports 476, one port being provided for each plunger device 410 and the sealing member 450 is provided with a corresponding series of apertures 478. The ports 476 in communication with groove 470 will permit the compressed air thereinto to communicate with the respective cylindrical chambers 434 associated therewith by means of a hose 480 having one end connected with the associated port 476 and the opposite end connected with a port 482 communicating with the upper end of the associated cylindrical chamber. An outlet or exhaust pipe 484 leads from the groove 472 so that the ports 476 in communication with the groove 472 will permit the associated cylindrical chambers 434 to exhaust the compressed air held therein.

Each plunger 420 is moved upwardly when in communication with the exhaust pipe 484 by a cam track 486 suitably mounted on the table 74. This cam track 486 is arranged to engage a cam roller 488 journaled on the outer end of a horizontally disposed shaft 490 extending through the central portion of each plunger 420. The inner end of each shaft 490 is provided with a guide roller 492 which rides in a groove 494 formed in the adjacent portion of the dial frame 400. The engagement of rollers 492 in guide grooves 494 prevents the plungers 420 from rotating or turning about their own axes. Threadedly mounted on each plunger 420 above the bushing 426 is a pair of cooperating stop nuts 496 which engage the flanges 428 to limit the downward movement of the plunger head.

Each shell, with a preheated charge of plastic material therein, is moved onto a seat 408 of the molding dial frame 400 from the transfer dial 66 by the guide member 370, with the associated plunger device in the position shown on the right hand side of Figure 19. It will be seen that cam track 486 is in engagement with cam roller 488 so as to maintain the plunger in a raised position suitable to permit free entry of the shell onto the associated seat 408. In addition, it will be noted that the associated chamber 476 is in communication with the exhaust pipe 484 thereby permitting the plunger to assume the raised position.

As the shell is carried around the dial, cam track 486 terminates to permit the associated plunger to fall by gravity into engagement with the charge within the shell. Next, the associated port 476 moves out of communication with the groove 472 and into communication with the groove 470 so that compressed air from inlet pipe 474 is communicated with the associated cylindrical chamber 434 so as to apply a downward molding pressure to the charge. Before and during the molding of the charge within the shell, the latter is moved past heater 67, which is preferably a gas burner, so as to insure a hot molding of the charge.

When the hot molding of the charge within the shell is completed, the associated port 476 moves out of communication with the groove 470 and into communication with groove 472 permitting the cylindrical chamber 434 to exhaust. Thus, when cam track 486 engages cam roller 488, the plunger device 410 may move upwardly to dispose the plunger head out of engagement with the shell as shown in the right hand side of Figure 19.

Referring now to Figure 18, the lined shells are removed from the molding dial by means of a guide member 500 suitably mounted in fixed relation on the table 74. The guide member 500 includes a cam surface 502 disposed in the path of movement of the shells so as to move the latter from their seats 408 and into a stationarily mounted chute 504 which directs the shells onto the transverse conveyor 68. As mentioned above, the shells from transverse conveyor 68 are suitably transferred therefrom onto a main inspection conveyor 70.

*Charge supplying mechanism of Figures 21–28*

Referring now to Figures 21–28, there is shown a charge supplying mechanism 72 which may be utilized in lieu of the charge supplying mechanism 58 heretofore described and shown in Figures 1–20. This mechanism is arranged to supply charges in the form of preformed pellets 508 containing a measured amount of plastic sealing material. The mechanism 72 is controlled by means of a no-closure no-charge mechanism 60' operable in the same manner as the mechanism 60 previously described. In the following description of the charge supplying mechanism 72, corresponding parts of the no-closure no-charge mechanism 60 are indicated by corresponding primed numerals.

The charge supplying mechanism 72 is mounted on a supporting frame 510 which includes a horizontal ledge 512 having a vertical bearing 514 disposed therebelow within which shaft 286' is journaled. Rigidly mounted on the upper surface of the ledge 512 by any suitable means is a block 516 having a vertically extending through hole 518 concentric with the axis of the shaft 286' and of a diameter slightly greater than the diameter of the star wheel 288' mounted thereon.

Suitably mounted on the upper end of shaft 286' in fixed relation thereon above block 516 is a circular dial plate 520 having a plurality of circumferentially spaced elongated pellet receiving pockets or holes 522 formed therein. Each pocket 522 receives a pellet from a supply tube 524 as the latter moves underneath the tube. The dial plate 520 moves the pellets along the upper surface of the block until the latter terminates at a point adjacent the preheating and lining dial mechanism 56.

As shown in Figure 22, a horizontal slot 526 is formed in the outer end of the block 516 within which the outer end portions of the slide members 190 are adapted to move. The vertical extent of slot 526 is slightly greater than the thickness of the pellets 508 and hence, the outer end portions of the slide members are reduced in thickness, as at 528, so as to fit within the slot.

As shown in Figures 24 and 25, the upwardly facing horizontal surface provided by the slot 526 receives the pellets 508 as they are moved over the terminal edge of the upper surface of the block. As shown in Figure 21, the U-shaped slots 210 of the plungers are then operable to engage the pellet and transfer it inwardly into a position above the associated shell. An extension plate 530 is provided at the trailing edge of the block 516 and has an upper horizontal surface level with the upwardly facing surface provided by slot 526 for supporting the pellets during their inward movement with the slide members.

The dial plate 520 is intermittently rotated by engagement of the slide member fingers 212 wih the arms of the star wheel 288'. As before, each successive arm of the star wheel is positioned for proper registry with each successive finger by a spring pressed ball 296' engaging within notches of detent collar 290' fixedly mounted on the lower end of shaft 286'.

The no-closure no-charge mechanism 60' includes shell engaging member 312' mounted on ledge 512 and slidable within a horizontal slot 532 formed in the lower surface of the block 516. As before, shell engaging member 312' is resiliently urged into engagement with the shells on the preheating and lining dial by means of spring pressed plug 318'.

Movement of the shell engaging member 312' is transmitted to the axially movable star wheel 288' by means of bell crank 326', the central hub portion 328' of which is fixed to an elongated shaft 330' journaled within an elongated bore 534 formed in block 516. As best shown in Figures 26–28, the lower arm 336' of bell crank 326', which engages within aperture 338' of member 312', is fixedly connected with the shaft 330' at a point spaced axially from the central hub portion 328', by an integral collar 536 disposed within a vertical slot 538 formed in the block 516. Upper arms 340' of bell crank 326', as before, extend horizontally outwardly from the central hub portion 328' and have arcuate portions 342' on their free ends which extend between the star wheel 288' and annular flange 344' formed on the lower end of depending hub 346'. As shown in Figures 24 and 25, the lower surface of the dial plate 520 may be provided with a recess 540 to enable the star wheel 288' to move upwardly sufficient to clear the slide member fingers 212.

The manner in which the dial plate 520 moves the pellets 508 into a position to be transferred by the slide members 190 is indicated above, and since the dial is intermittently rotated and controlled in the same manner as previously described in connection with the embodiment of Figures 1–20, no further description is believed to be necessary.

It can thus be seen that there has been provided by the present invention a machine continuously operable to apply liners of a plastic moldable sealing material to the central interior of closures, such as bottle crowns or caps. It will be understood that many plastic materials may be utilized within the scope of the present invention. For example, either thermoplastic or a thermosetting plastic may be utilized.

The following are illustrations of thermoplastic materials that may be utilized:

Polyvinyl chloride and copolymers, e.g. polyvinyl chloride acetate.
Polymethyl methacrylate
Polystyrene
Polyethylene
Polyvinylidene chloride and copolymers, e.g. a copolymer with vinyl chloride.
Polyisobutylene
Chlorosulfonated polyethylene
Irradiated polyethylene
Polyamid resins (e.g. nylon such as polymeric hexamethylene adipamide and polymeric epsilon caprolactam)
Ethyl cellulose
Polyvinyl acetals, e.g. polyvinyl butyral and polyvinyl formal.

The plastics compounds, recited in the copending Cooke and Rainer application, Serial No. 400,747 are also particularly applicable to this invention.

The following are illustrations of thermosetting materials that may be utilized.

Epoxy resins, e.g. bisphenol A-epichlorhydrin
Polyurethanes, e.g. toluene diisocyanate mixed with trimethylol propane-phthalic anhydride-adipic acid resin
Alkyd resins, e.g. glycerol phthalate resins The various heating temperatures and molding pressures, as well as the time intervals of their application, will vary in accordance with the materials utilized. Hence, it will be appreciated that the changes necessary to alter the temperatures and pressures applied, may be readily made in the machine without extensive revision.

Frequently it is desirable to improve the adhesion of the plastic to the lacquered crown shell by applying an adhesive to the crown shell prior to insertion of the plastic. There are several adhesives which can be employed for this function. Thus, there can be employed a blend of a phenolformaldehyde resin and butadiene acrylinitrile copolymer. Adhesives of this type are sold under the trade mark "Hycar." There can also be employed epoxy resin adhesives, more especially, resins from bisphenol A-epichlorhydrin. Suitable adhesives of the epoxy class are described in United States Patents 2,324,483, 2,444,333, 2,500,449 and 2,500,600. The adhesive can be coated on the central interior of the lacquered crown in any conventional fashion as, for example, by the glue applying mechanism disclosed in the aforesaid Wilckens and Rau Patent 2,703,130, and then the plastic moldable sealing material applied, as previously set forth in the specification.

It will also be appreciated that the machine of the present invention provides many salient features useful in applying liners of material other than plastic to closures of all types, as, for example, cork liners or the like. Moreover, the teachings of the present invention are applicable in molding plastic material in forms other than crown shells, as, for example, molding dies and the like.

It is therefore to be understood that the forms of the invention herewith shown and described are to be taken as the preferred embodiments of the same and that various changes may be made without departing from the spirit of the invention or the scope of the appended claims.

We claim:
1. In a machine for applying liners of moldable sealing material to closures, a rotary dial having a plurality of circumferentially spaced seats for supporting a series of closures, means spaced radially outwardly of said seats for supplying measured charges of a solid moldable sealing material for said closures, a radially extending slide member disposed above each of said seats for transferring a measured charge from said supplying means to a point above the associated closure during the rotation of said dial and vertically movable plunger means disposed above each of said seats for depositing said charge into said closure, said charge supplying means including a star wheel rotatable by engagement of said slide members therewith, and means operable in response to rotation of said star wheel for moving the charges of said material into a position to be transferred by said slide members.

2. A machine of the character described in claim 1 including a closure engaging member disposed in the path of movement of the closures carried by said dial, said closure engaging member being movable into an actuating position in response to the absence of a closure on the seat adjacent thereto, and means operatively connecting said closure engaging member with said star wheel whereby the latter will be moved out of engaging relationship with said slide members by the movement of said closure engaging member into said actuating position.

3. A machine of the character described in claim 2 wherein said closure-engaging member is slidably mounted and includes a closure-engaging surface having a width greater than the spacing between the adjacent closures but less than the spacing between the outer closures of three adjacent closures.

4. A machine of the character described in claim 1 wherein said star wheel rotation responsive means includes a pair of cooperating rollers operatively connected with said star wheel for rotation therewith, said rollers being arranged to move the end of a continuous rod of said moldable material into a position to be cut off by said slide members.

5. A machine of the character described in claim 4 wherein said star wheel is operatively connected with said complementary rollers by means of a friction clutch.

6. A machine of the character described in claim 1 wherein said star wheel rotation responsive means includes a rotary dial operatively connected with said star wheel for rotation therewith, the rotary dial of said charge supplying means being arranged to move preformed pellets of said moldable material into a position to be transferred by said slide members.

7. In a machine for applying liners of moldable sealing material to closures, means for supplying successive charges of solid moldable sealing material in the form of disks at a predetermined transfer position, continuously traveling supporting means having a plurality of seats for carrying a series of unlined closures past said charge supplying means in spaced relation to said predetermined position, a disk transferring member mounted on said traveling supporting means adjacent each seat thereof for movement during the movement of said traveling supporting means between a disk receiving position and a disk depositing position, each of said members having a disk receiving aperture extending therethrough, each of said apertures being open in the direction of travel, the apertures being disposed in said members so that when the latter are in said disk receiving position the apertures pass through said predetermined transfer position and successive disks therein are engaged within the apertures through the openings thereof and so that when the members are disposed in said disk depositing position the apertures are in alignment with the closures on the associated seats, and a plunger mounted on said traveling supporting means adjacent each seat for movement toward and away from the latter during the movement of said traveling supporting means, said plungers being operable to pass through the apertures in said members when the latter are disposed in said disk transferring position to move the disks in said apertures into the closures on the associated seats.

8. In a machine for applying liners of moldable sealing material to closures, a rotary dial having a plurality of stationary seats formed thereon in circumferentially spaced relation for supporting a series of closures for movement therewith about a vertical axis, means spaced radially outwardly of said seats for supplying measured charges of a solid moldable sealing material in the form of disks, a disk transferring member mounted on said dial for radial sliding movement during the rotation of said dial between an outer disk receiving position adjacent said supplying means and an inner disk depositing position, each of said members having a disk receiving aperture extending vertically therethrough, each of said apertures also being open in the direction of travel so that a disk charge presented by said supplying means is engaged in said aperture through the lateral opening thereof as said disk receiving member moves past said supplying means, in said outer position, and a plunger mounted on said dial above each seat for movement toward and away from the latter, each of said plungers being operable during rotation of said dial when the associated disk receiving member is disposed in said disk depositing position to move downwardly through the aperture in the associated member and move the disk engaged therein into the closure on the associated seat therebelow.

9. A machine of the character described in claim 8 wherein said charge supplying means includes a pair of cooperating rollers arranged to move the end of a continuous rod of moldable material into a position to be cut off by said slidable members.

10. A machine of the character described in claim 8 wherein said charge supplying means includes a cooperating rotary dial arranged to move preformed disk shaped pellets of said moldable material into a position to be engaged by said slide members.

References Cited in the file of this patent
UNITED STATES PATENTS

| | | |
|---|---|---|
| 1,053,898 | Bogdanffy | Feb. 18, 1913 |
| 2,204,878 | Kadow | Nov. 14, 1916 |
| 1,531,559 | Lynch | Mar. 31, 1925 |
| 1,645,755 | Kadow | Oct. 18, 1927 |
| 1,807,155 | Frederick | May 26, 1931 |
| 2,027,915 | Kux | Jan. 14, 1936 |
| 2,218,456 | Soubier et al. | Oct. 15, 1940 |
| 2,218,540 | Kronquest | Oct. 22, 1940 |
| 2,287,356 | Newman | June 23, 1942 |
| 2,516,908 | Pottle | Aug. 1, 1950 |
| 2,618,904 | Gartner | Nov. 25, 1952 |
| 2,745,135 | Gora | May 15, 1956 |
| 2,851,727 | Wilckens et al. | Sept. 16, 1958 |